(12) United States Patent
Hagita et al.

(10) Patent No.: US 11,940,164 B2
(45) Date of Patent: Mar. 26, 2024

(54) VEHICLE AIR CONDITIONING SYSTEM AND CONTROL METHOD OF VEHICLE AIR CONDITIONING SYSTEM

(71) Applicant: MITSUBISHI HEAVY INDUSTRIES THERMAL SYSTEMS, LTD., Tokyo (JP)

(72) Inventors: Takayuki Hagita, Tokyo (JP); Nobuya Nakagawa, Tokyo (JP); Hideto Noyama, Tokyo (JP)

(73) Assignee: MITSUBISHI HEAVY INDUSTRIES THERMAL SYSTEMS, LTD, Tokyo (JP)

( * ) Notice: Subject to any disclaimer, the term of this patent is extended or adjusted under 35 U.S.C. 154(b) by 380 days.

(21) Appl. No.: 17/438,638

(22) PCT Filed: Feb. 12, 2020

(86) PCT No.: PCT/JP2020/005246
§ 371 (c)(1),
(2) Date: Sep. 13, 2021

(87) PCT Pub. No.: WO2020/189099
PCT Pub. Date: Sep. 24, 2020

(65) Prior Publication Data
US 2022/0221177 A1    Jul. 14, 2022

(30) Foreign Application Priority Data

Mar. 15, 2019    (JP) .................................. 2019-048502

(51) Int. Cl.
*F24F 11/36*    (2018.01)
*B60H 1/24*    (2006.01)
(Continued)

(52) U.S. Cl.
CPC ................. *F24F 11/36* (2018.01); *B60H 1/24* (2013.01); *F24F 11/50* (2018.01); *F24F 11/89* (2018.01);
(Continued)

(58) Field of Classification Search
CPC . F24F 11/36; F24F 11/50; F24F 11/89; B60H 2001/325; B60H 2001/3255;
(Continued)

(56) References Cited

U.S. PATENT DOCUMENTS 6,266,965 B1    7/2001  Takano et al.
6,725,676 B2    4/2004  Takano et al.
(Continued)

FOREIGN PATENT DOCUMENTS

JP    58-54904 U    4/1983
JP    58-54905 U    4/1983
(Continued)

OTHER PUBLICATIONS

International Search Report, issued in PCT/JP2020/005246, dated Mar. 24, 2020.
(Continued)

*Primary Examiner* — Kun Kai Ma
(74) *Attorney, Agent, or Firm* — BIRCH, STEWART, KOLASCH & BIRCH, LLP (57) ABSTRACT

The purpose of the present invention is to provide a vehicle air conditioning system and a control method of the vehicle air conditioning system which enable detecting leaks of flammable refrigerant without requiring a separate sensor. This vehicle air conditioning system is provided with: a refrigeration cycle for cooling (23); a heat pump cycle for heating (33); a refrigerant that is very flammable, has an explosive range near room temperature, and circulates in the refrigeration cycle for cooling (23) and the heat pump cycle
(Continued)

for heating (33); an outside temperature sensor (44) which detects the outside temperature; a pressure sensor (49) which detects the refrigerant pressure; and a control device which calculates the refrigerant density, which is the density of refrigerant, on the basis of the outside temperature and the pressure, and determines whether or not the refrigerant density has fallen below a prescribed threshold value which is based on the amount of sealed refrigerant, the total volume in the refrigeration cycle for cooling (23) and in the heat pump cycle for heating (33), the volume of the vehicle cabin, the standard density of the atmosphere, and the explosive limit of the refrigerant.

4 Claims, 6 Drawing Sheets

(51) Int. Cl.
  *F24F 11/50* (2018.01)
  *F24F 11/89* (2018.01)
  *F25B 49/02* (2006.01)

(52) U.S. Cl.
  CPC ........ *F25B 49/02* (2013.01); *F25B 2500/222* (2013.01); *F25B 2700/19* (2013.01); *F25B 2700/2106* (2013.01)

(58) Field of Classification Search
  CPC ................. B60H 1/00978; F25B 49/02; F25B 2500/222; F25B 2700/19; F25B 2700/2106
  See application file for complete search history.

(56) References Cited

U.S. PATENT DOCUMENTS

| | | | |
|---|---|---|---|
| 2002/0139128 A1 | 10/2002 | Suzuki et al. | |
| 2016/0075212 A1* | 3/2016 | Morishita | B60H 1/00899 165/41 |
| 2016/0146521 A1* | 5/2016 | Tomita | F25B 49/022 62/190 |

FOREIGN PATENT DOCUMENTS

| | | | | |
|---|---|---|---|---|
| JP | 2001-12830 A | 1/2001 | | |
| JP | 2002-364951 A | 12/2002 | | |
| JP | 2004-17681 A | 1/2004 | | |
| JP | 2005-16897 A | 1/2005 | | |
| JP | 2005-178428 A | 7/2005 | | |
| JP | 2009139012 A | * | 6/2009 | |
| JP | 2010-30418 A | 2/2010 | | |
| JP | 4758705 B2 | * | 8/2011 | ........... B60H 1/3211 |
| JP | 2014-88093 A | 5/2014 | | |
| JP | 2016-99059 A | 5/2016 | | |
| JP | 2017-156019 A | 9/2017 | | |
| JP | 6302809 B2 | 3/2018 | | |
| WO | WO 2015/004967 A1 | 1/2015 | | |

OTHER PUBLICATIONS

Japanese Decision to Grant a Patent, issued in Priority Application No. 2019-048502, dated Jul. 7, 2020.

Written Opinion of the International Searching Authority, issued in PCT/JP2020/005246, dated Mar. 24, 2020.

* cited by examiner

VEHICLE AIR CONDITIONING SYSTEM AND CONTROL METHOD OF VEHICLE AIR CONDITIONING SYSTEM

TECHNICAL FIELD

The present disclosure relates to a vehicle air conditioning system and a control method of a vehicle air conditioning system.

BACKGROUND ART

As a global warming countermeasure, the use of carbon dioxide, propane, or the like having a low global warming potential (GWP) as a refrigerant in a vehicle air conditioning system has been studied. Note that a refrigerant, such as propane, has flammability. In a case where a flammable refrigerant leaks and ignites, combustion or explosion is a concern.

Accordingly, detecting leakage of the refrigerant in a case where a flammable refrigerant is used in the vehicle air conditioning system has been studied.

For example, PTL 1 discloses an invention in which a flammable refrigerant detection sensor for detecting a flammable refrigerant amount leaking in a casing is provided, and a refrigerant leakage amount is detected.

CITATION LIST

Patent Literature

[PTL 1] Japanese Unexamined Patent Application Publication No. 2005-178428

SUMMARY OF INVENTION

Technical Problem

Note that, in the invention disclosed in PTL 1 described above, since there is a need to separately provide the flammable refrigerant detection sensor, there is a problem in that costs and an installation space are needed.

The present disclosure has been accomplished in view of such a situation, and an object of the present disclosure is to provide a vehicle air conditioning system and a control method of a vehicle air conditioning system capable of detecting leakage of a flammable refrigerant without needing a sensor separately.

Solution to Problem

To solve the above-described problem, a vehicle air conditioning system and a control method of a vehicle air conditioning system of the present disclosure employ the following means.

A vehicle air conditioning system according to an aspect in some embodiments of the present disclosure is a vehicle air conditioning system including a refrigerant circuit for cooling in which a compressor, switching means, a vehicle-cabin-exterior condenser, first decompression means, and a vehicle-cabin-interior evaporator provided in an HVAC unit are connected in this order, a refrigerant circuit for heating in which the compressor, the switching means, a vehicle-cabin-interior condenser, second decompression means, and a vehicle-cabin-exterior evaporator are connected in this order, a refrigerant that has high flammability, has a range of explosion near a normal temperature, and flows through the refrigerant circuit for cooling and the refrigerant circuit for heating, an outside air temperature sensor that detects an outside air temperature, a pressure sensor that detects a pressure of the refrigerant, and a control device that calculates a refrigerant density as a density of the refrigerant based on the outside air temperature and the pressure, and determines whether or not the refrigerant density falls below a predetermined threshold value based on an amount of filled refrigerant, a total volume of the refrigerant circuit for cooling and the refrigerant circuit for heating, a volume of a vehicle cabin, a standard density of atmosphere, and an explosion limit of the refrigerant.

In a case where the refrigerant having high flammability and having a range of explosion near a normal temperature leaks from the vehicle air conditioning system and a composition of the refrigerant with respect to a space (a ratio to air) reaches the explosion limit, there is a concern that the refrigerant may explode due to ignition.

In this aspect, since the refrigerant density of the refrigerant having high flammability is detected, and determination is made whether or not the refrigerant density falls below the predetermined threshold value based on the explosion limit, it is possible to detect whether or not a leakage amount of the refrigerant is approaching the explosion limit. For this reason, even in a case where the refrigerant having high flammability is used in the vehicle air conditioning system, it is possible to secure safety against explosion.

Since the refrigerant density is calculated from the outside air temperature and the pressure, there is no need to provide new sensors for detecting leakage of the refrigerant, and it is possible to suppress costs. There is no need to secure a place for providing sensors.

Since determination is made whether or not the refrigerant density falls below the predetermined threshold value based on the amount of filled refrigerant, the total volume of the refrigerant circuit for cooling and the refrigerant circuit for heating, the volume of the vehicle cabin, the standard density of the atmosphere, and the explosion limit of the refrigerant, it is possible to determine whether or not the refrigerant density is approaching a value based on the explosion limit in the vehicle air conditioning system capable of uniquely deciding the volume of a space where the system is provided.

The high flammability is a class of high flammability represented by CLASS3 among the flammability classes classified by ISO817 (Refrigerants—Designation and safety classification). Examples of a representative refrigerant include R290 (propane) and R600a (isobutane).

The range of explosion is a range between a lower explosion limit and an upper explosion limit. Normally, the range of explosion is represented by a concentration of a flammable material at normal temperature and normal pressure. For example, the range of explosion of propane has a lower explosion limit of 2.1% and an upper explosion limit of 9.5%.

The explosion limit indicates the lower explosion limit or the upper explosion limit described above, and in this aspect, primarily indicates the lower explosion limit.

In the above-described aspect, the control device may include a notification unit that issues a warning in a case where determination is made that the refrigerant density falls below the predetermined threshold value.

According to this aspect, since the warning is issued in a case where determination is made that the refrigerant density falls below the predetermined threshold value, it is possible to inform a user of the vehicle or a person in the vicinity of the vehicle that leakage of the refrigerant is approaching the explosion limit, that there is a possibility of explosion, and that countermeasures are needed.

The notification unit may be any notification device including voice or alarm sound, or visual display. The notification unit may give notification to a portable terminal of a user through a network or may give emergency notification by way of the portable terminal. The notification unit may give notification to a car dealer, a maintenance facility, a vehicle manufacturer, or the like through a network.

In the above-described aspect, the control device may disable opening of a door of a vehicle from an outside in a case where determination is made that the refrigerant density falls below the predetermined threshold value.

According to this aspect, since opening of the door of the vehicle from the outside is disabled in a case where determination is made that the refrigerant density falls below the predetermined threshold value, it is possible to prevent the refrigerant leaking into the vehicle cabin from igniting and exploding due to a spark, static electricity, or the like caused by contact of a metal or the like when the closed door is opened.

A control method of a vehicle air conditioning system according to an aspect in some embodiments of the present disclosure is a control method of a vehicle air conditioning system having a refrigerant circuit for cooling in which a compressor, switching means, a vehicle-cabin-exterior condenser, first decompression means, and a vehicle-cabin-interior evaporator provided in an HVAC unit are connected in this order, a refrigerant circuit for heating in which the compressor, the switching means, a vehicle-cabin-interior condenser, second decompression means, and a vehicle-cabin-exterior evaporator are connected in this order, a refrigerant that has high flammability, has a range of explosion near a normal temperature, and flows through the refrigerant circuit for cooling and the refrigerant circuit for heating, an outside air temperature sensor that detects an outside air temperature, and a pressure sensor that detects a pressure of the refrigerant, the control method including a step of calculating a refrigerant density as a density of the refrigerant based on the outside air temperature and the pressure, and a step of determining whether or not the refrigerant density falls below a predetermined threshold value based on an amount of filled refrigerant, a total volume of the refrigerant circuit for cooling and the refrigerant circuit for heating, a volume of a vehicle cabin, a standard density of atmosphere, and an explosion limit of the refrigerant.

Advantageous Effects of Invention

According to the present disclosure, since the refrigerant density of the refrigerant having high flammability is calculated from the pressure of the refrigerant and the temperature, and determination is made whether or not the refrigerant density falls below the predetermined threshold value, it is possible to determine whether or not the leaking refrigerant is approaching the explosion limit without separately providing a leakage amount sensor or the like.

DESCRIPTION OF EMBODIMENTS

Each embodiment of a vehicle air conditioning system and a control method of a vehicle air conditioning system according to some embodiments of the present disclosure will be described below referring to the drawings.

Figure 1:
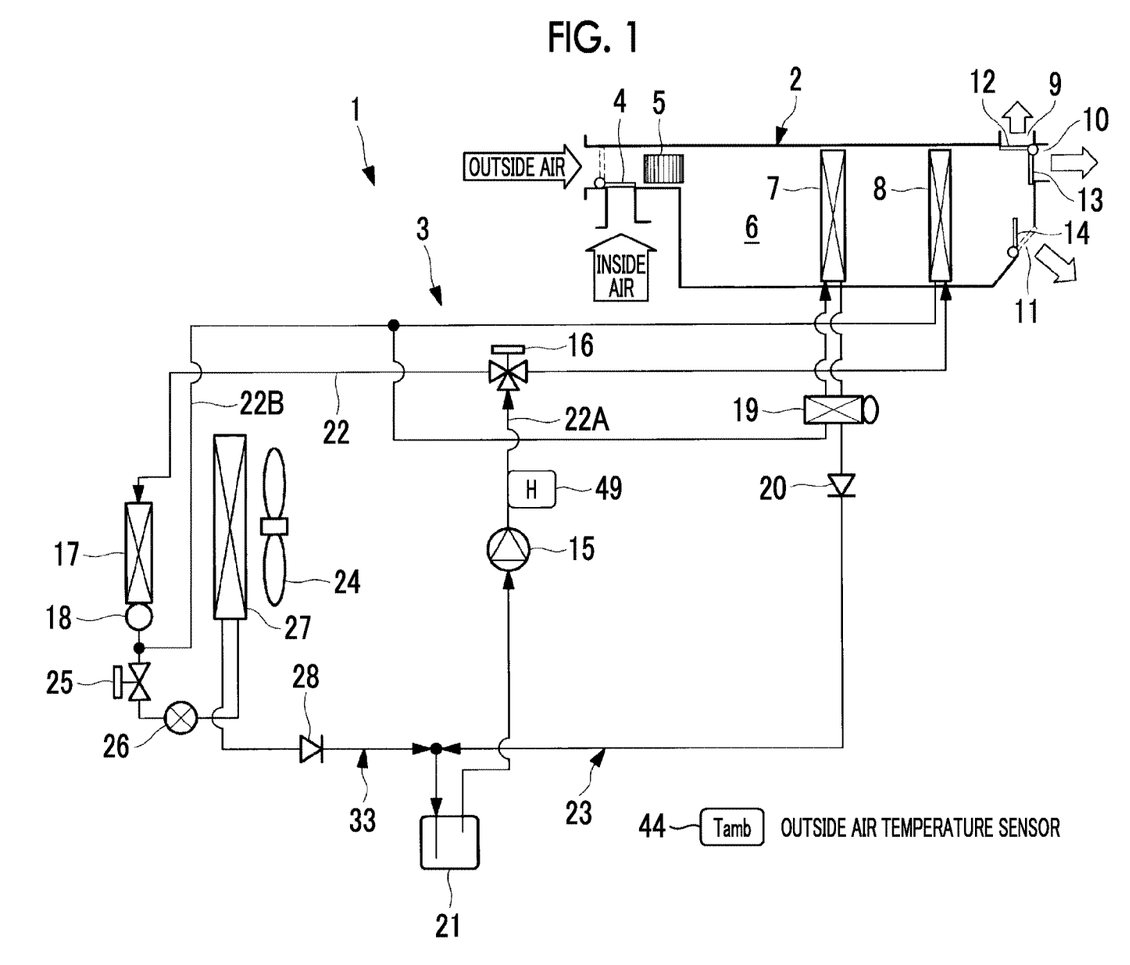
FIG. 1 is a refrigerant circuit diagram showing an aspect of a vehicle air conditioning system according to some embodiments.

FIG. 1 is a refrigerant circuit diagram of an aspect of a vehicle air conditioning system and a control method of a vehicle air conditioning system according to some embodiments of the present disclosure.

A vehicle air conditioning system 1 according to the embodiment includes a heating ventilation and air conditioning unit (HVAC unit) 2 and a heat pump cycle 3 capable of cooling and heating.

The HVAC unit 2 includes a blower 5 that switches and introduces inside air from a vehicle cabin or outside air by an inside air and outside air switching damper 4 and pumps inside air or outside air to a downstream side, and a vehicle-cabin-interior evaporator 7 and a vehicle-cabin-interior condenser 8 that are sequentially provided from an upstream side to a downstream side in an air flow channel 6 connected to the blower 5. The HVAC unit 2 is provided in an instrument panel on the vehicle cabin side, blows air whose temperature is adjusted through the vehicle-cabin-interior evaporator 7 and the vehicle-cabin-interior condenser 8, into the vehicle cabin from any of a plurality of defroster discharge outlets 9, face discharge outlets 10, or foot discharge outlets 11 opened toward the vehicle cabin in association with a blowing-out mode selectively switched by blowing-out switching mode dampers 12, 13, and 14, and air-conditions the vehicle cabin to a set temperature.

Figure 2:
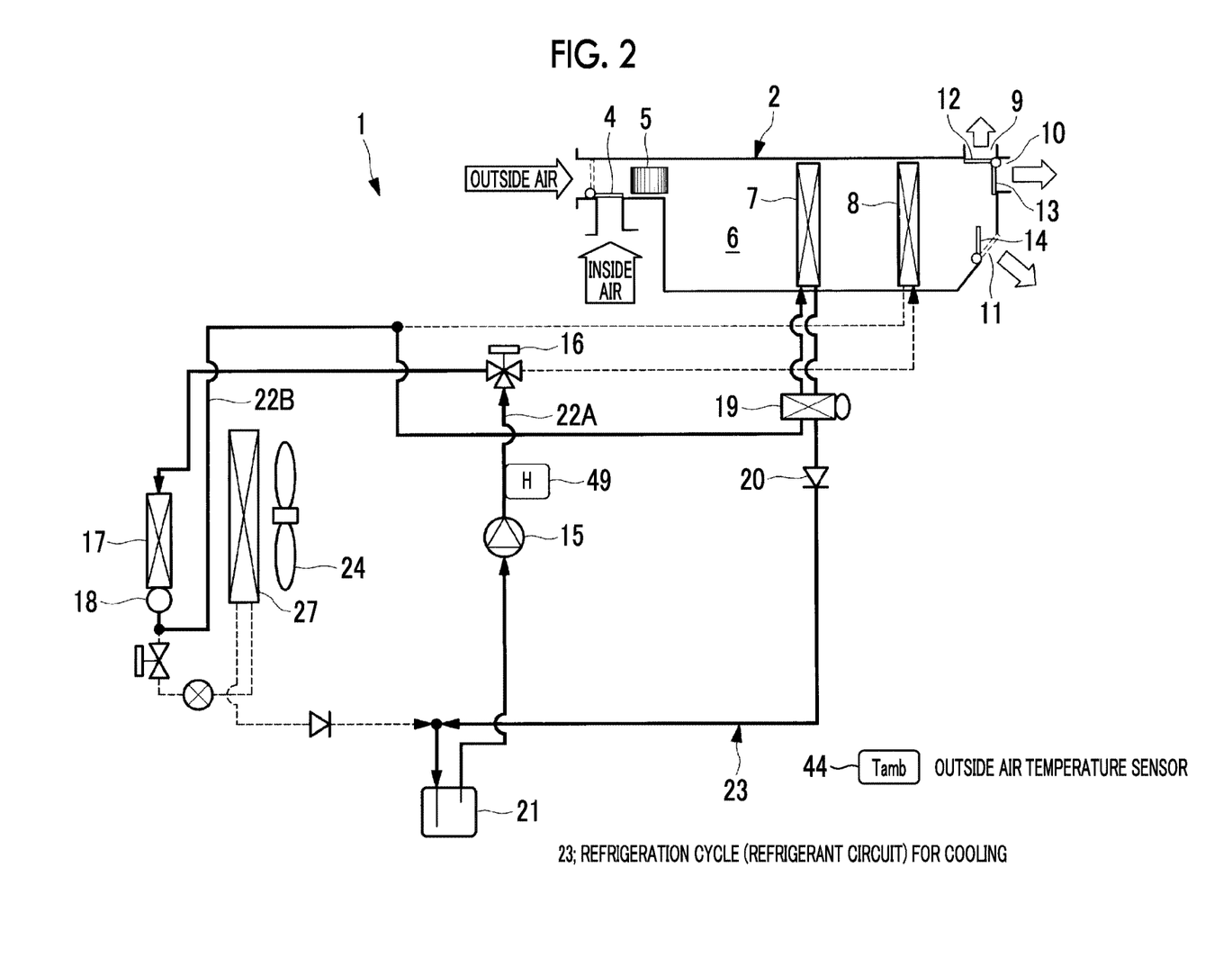
FIG. 2 is a refrigerant circuit diagram showing a refrigerant flow at the time of cooling of the vehicle air conditioning system according to some embodiments.

As shown in FIG. 2, the heat pump cycle 3 capable of cooling and heating includes a closed-cycle refrigeration cycle 23 for cooling (refrigerant circuit for cooling) in which a compressor 15 that compresses a refrigerant, switching means (three-way switching valve) 16 that switches a flow direction of the refrigerant, a vehicle-cabin-exterior condenser 17, a receiver 18, a first decompression means with an on-off valve function (electromagnetic valve-equipped temperature-driven automatic expansion valve) (first decompression means) 19, a vehicle-cabin-interior evaporator 7, a check valve 20, and an accumulator 21 are sequentially connected by a refrigerant pipe 22. A vehicle-cabin-exterior fan 24 that blows outside air is fitted to the vehicle-cabin-exterior condenser 17. The switching means 16 may be replaced by a configuration in which two electromagnetic valves are combined.

As shown in FIG. 1, the vehicle-cabin-interior condenser 8 provided in the HVAC unit 2 is connected to a discharge pipe (discharge circuit) 22A from the compressor 15 with respect to the refrigeration cycle 23 for cooling in the heat pump cycle 3 for cooling and heating through the switching means 16, and a refrigerant outlet of the vehicle-cabininterior condenser 8 is connected to an outlet-side liquid refrigerant pipe 22B of the vehicle-cabin-exterior condenser 17. A vehicle-cabin-exterior evaporator 27 is connected to the outlet-side liquid refrigerant pipe 22B of the vehicle-cabin-exterior condenser 17 through a second on-off valve (electromagnetic valve) 25 and second decompression means (expansion valve) (hereinafter, both are collectively referred to as a second decompression means 26 with an on-off valve function), and a refrigerant outlet of the vehicle-cabin-exterior evaporator 27 is connected to the accumulator 21 through a check valve 28.

Figure 3:
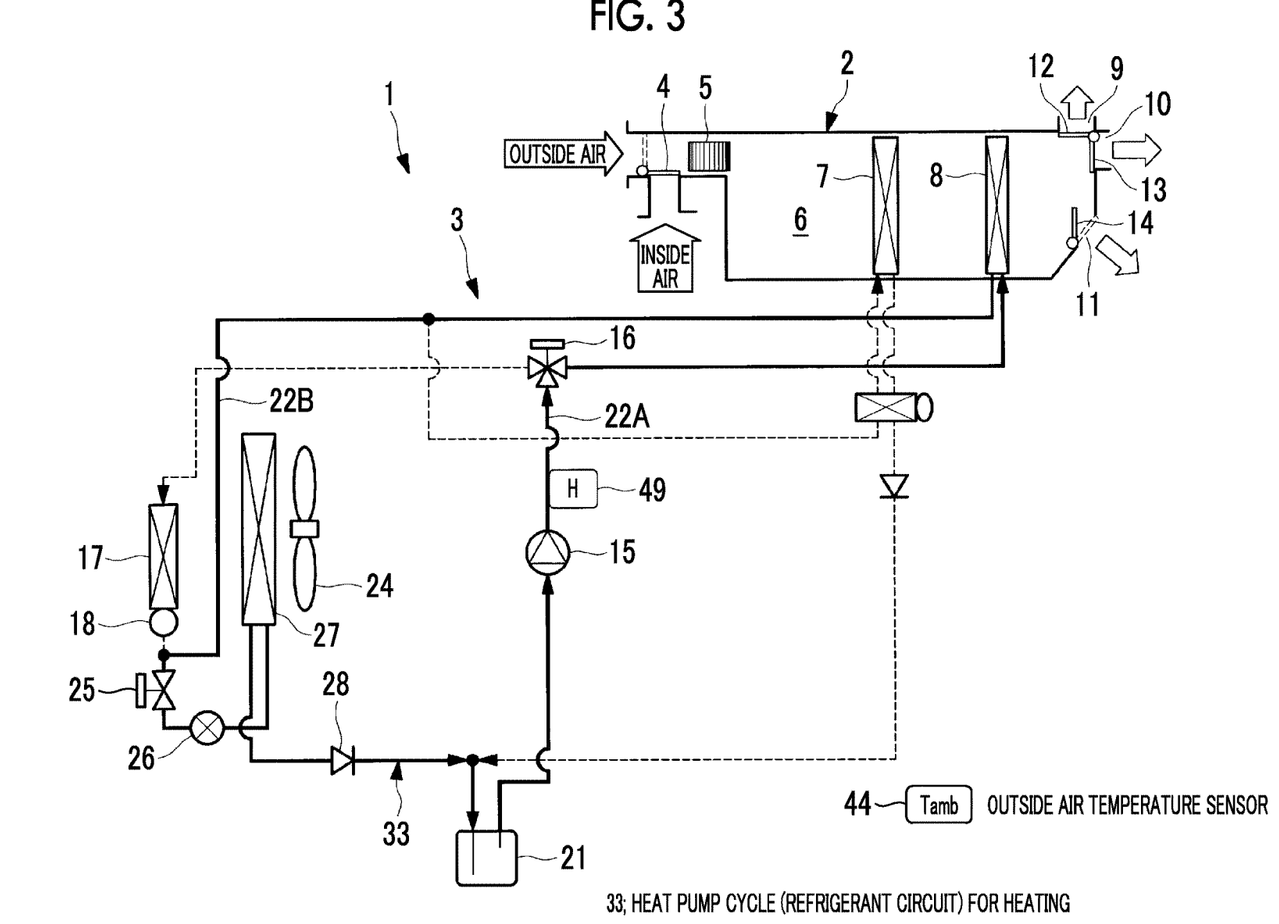
FIG. 3 is a refrigerant circuit diagram showing a refrigerant flow at the time of heating of the vehicle air conditioning system according to some embodiments.

With this, as shown in FIG. 3, a closed-cycle heat pump cycle 33 for heating (refrigerant circuit for heating) can be configured in which the compressor 15, the switching means 16, the vehicle-cabin-interior condenser 8, the outlet-side liquid refrigerant pipe 22B, the second decompression means 26 with an on-off valve function (second on-off valve 25 and second decompression means 26), the vehicle-cabin-exterior evaporator 27, the check valve 28, and the accumulator 21 are connected through the refrigerant pipe 22 in this order.

Next, a refrigerant flow during an operation of the vehicle air conditioning system 1 will be described referring to FIGS. 2 and 3. In each drawing, the refrigerant flow during the operation is indicated by thick lines.

[Cooling Operation]

During a cooling operation, as shown in FIG. 2, the refrigerant compressed in the compressor 15 is circulated from the discharge pipe 22A to the vehicle-cabin-exterior condenser 17 through the switching means 16, and is condensed by heat exchange with outside air blown by the vehicle-cabin-exterior fan 24. The liquid refrigerant is stored in the receiver 18, then, is decompressed through the outlet-side liquid refrigerant pipe 22B and the first decompression means 19 with an on-off valve function, and is supplied to the vehicle-cabin-interior evaporator 7 in the HVAC unit 2.

The refrigerant supplied to the vehicle-cabin-interior evaporator 7 is evaporated by heat exchange with inside air or outside air blown from the blower 5, and is absorbed into the compressor 15 through the check valve 20 and the accumulator 21 to be recompressed. Hereinafter, the same cycle is repeated. Inside air or outside air cooled by heat exchange with the refrigerant in the vehicle-cabin-interior evaporator 7 is blown into the vehicle cabin from any of the defroster discharge outlets 9, the face discharge outlets 10, or the foot discharge outlets 11 in association with the blowing-out mode switched by the blowing-out mode switching dampers 12, 13, and 14, and is provided for cooling in the vehicle cabin.

During the cooling operation, the second on-off valve 25 of the second decompression means 26 with an on-off valve function is closed.

[Heating Operation]

During a heating operation, as shown in FIG. 3, the refrigerant compressed in the compressor 15 is introduced from the discharge pipe 22A into the vehicle-cabin-interior condenser 8 through the switching means 16, and here, dissipates heat by heat exchange with inside air or outside air blown from the blower 5. Air heated in this manner is blown from any of the defroster discharge outlets 9, the face discharge outlets 10, and the foot discharge outlets 11 and is provided for heating in the vehicle cabin. A normal heating operation is performed in an outside air introduction mode to prevent fogging of windows.

The refrigerant heat-dissipated, condensed, and liquefied in the vehicle-cabin-interior condenser 8 is decompressed through the outlet-side liquid refrigerant pipe 22B and the second decompression means 26 with an on-off valve function (in this case, the second on-off valve 25 is opened) and is supplied to the vehicle-cabin-exterior evaporator 27. The two-phase gas-liquid refrigerant exchanges heat with outside air blown by the vehicle-cabin-exterior fan 24 in the vehicle-cabin-exterior evaporator 27, absorbs heat from outside air to be evaporated, then, is absorbed into the compressor 15 through the check valve 28 and the accumulator 21, and is recompressed. Hereinafter, the same cycle is repeated. Heat pump heating is performed by the heat pump cycle 33 for heating.

In this way, the existing refrigeration cycle 23 for cooling is used, the vehicle-cabin-interior condenser 8 for heating is connected to the discharge pipe 22A of the refrigeration cycle 23 for cooling through the switching means 16, and the vehicle-cabin-exterior evaporator 27 for heating is connected through the second decompression means 26 with an on-off valve function (second on-off valve 25 and second decompression means 26), whereby it is possible to configure the heat pump cycle 33 for heating by sharing some circuit portions and equipment.

During the heating operation, the electromagnetic valve of the first decompression means 19 with an on-off valve function is closed.

Figure 4:
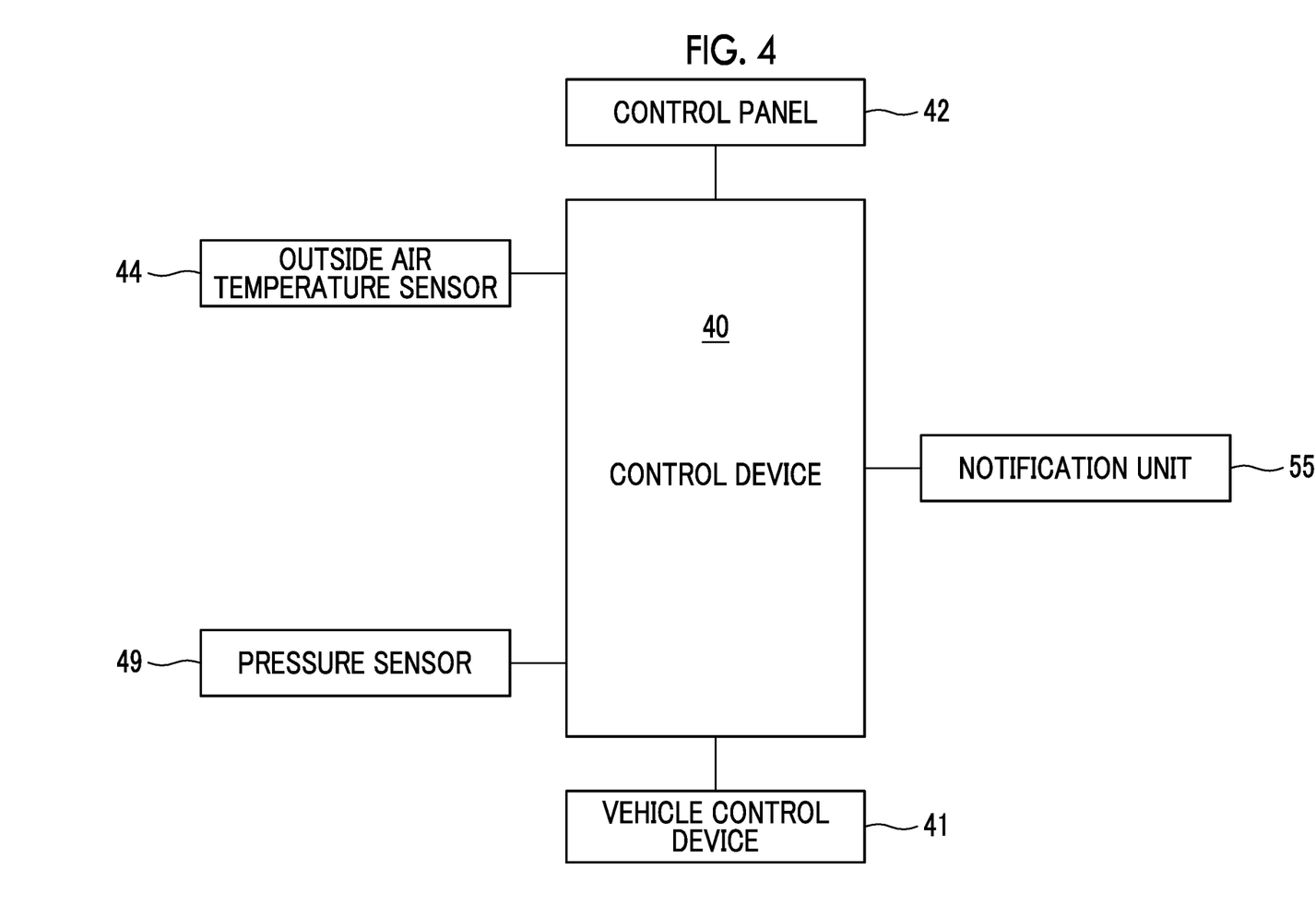
FIG. 4 is a block diagram of a control device of the vehicle air conditioning system according to some embodiments.

The above operations are connected by a control device 40 shown in FIG. 4. The control device 40 is connected to a vehicle control device 41 as a higher-level control device on the vehicle side and is configured such that information from the vehicle side is input. The control device 40 includes a control panel 42 and performs operation control of the vehicle air conditioning system 1 based on detection signals from a sensor group described below and input information from the vehicle control device 41 and the control panel 42.

Detection signals of a sensor group, such as an outside air temperature sensor 44 and a pressure sensor 49 provided in the discharge pipe 22A, are input to the control device 40.

The control device 40 has a function of controlling an operation of the vehicle air conditioning system 1 by performing required arithmetic operations and processing in association with a program set in advance and controlling a notification unit 55 and the like based on the detection signals from the above-described sensor group and the input information from the control panel 42 and the vehicle control device 41.

The control device 40 is configured with, for example, a central processing unit (CPU), a random access memory (RAM), a read only memory (ROM), a non-transitory computer readable storage medium, and the like. Then, a series of processing for realizing various functions is stored in a storage medium or the like in the form of a program as an example, and various functions are realized by the CPU reading the program to the RAM or the like and executing information processing and arithmetic processing. The program may be installed in advance in the ROM or another storage medium, may be provided in a state of being stored in a computer readable storage medium, or may be distributed through wired or wireless communication means. The computer-readable storage medium includes a magnetic disk, a magneto-optical disk, a CD-ROM, a DVD-ROM, a semiconductor memory, or the like.

In a case where a flammable refrigerant, and in particular, a refrigerant having high flammability that is a class of high flammability represented by CLASS3 among the flammability classes of refrigerants classified by ISO817 (Refrigerants—Designation and safety classification) is used in the vehicle air conditioning system 1, there is a need to detect leakage as a safety countermeasure.

Representative examples of the refrigerant having high flammability include R290 (propane) and R600a (isobutane). In the embodiment, it is assumed that R290 (propane) is used as a refrigerant.

Propane has a range of explosion near a normal temperature. Propane explodes (or combusts) when a ratio to air is a range of 2.1% to 9.5%. A lower limit (2.1%) of the ratio is referred to as a lower explosion limit, and an upper limit (9.5%) of the ratio is referred to as an upper explosion limit. A range of 2.1% to 9.5% between the lower explosion limit and the upper explosion limit is referred to as a range of explosion.

The range of explosion of isobutane is 1.8% to 8.4%.

In a case where a refrigerant that has high flammability and has a range of explosion near a normal temperature leaks, the ratio of the refrigerant in the vehicle cabin enters the range of explosion due to a leakage amount. In this case, there is a concern that any ignition may cause an explosion. Thus, it is assumed that determination is made whether or not the ratio of the refrigerant is approaching the range of explosion before the ratio of the refrigerant in the vehicle cabin enters the range of explosion.

In the embodiment, it is assumed that the control device 40 detects leakage of a refrigerant having high flammability using detection signals from the outside air temperature sensor 44 hitherto provided in the vehicle air conditioning system 1 and the pressure sensor 49 provided in the discharge pipe 22A.

Hereinafter, control of the vehicle air conditioning system 1 by the control device 40 of the embodiment will be described referring to a flowchart shown in FIG. 5.

Figure 5:
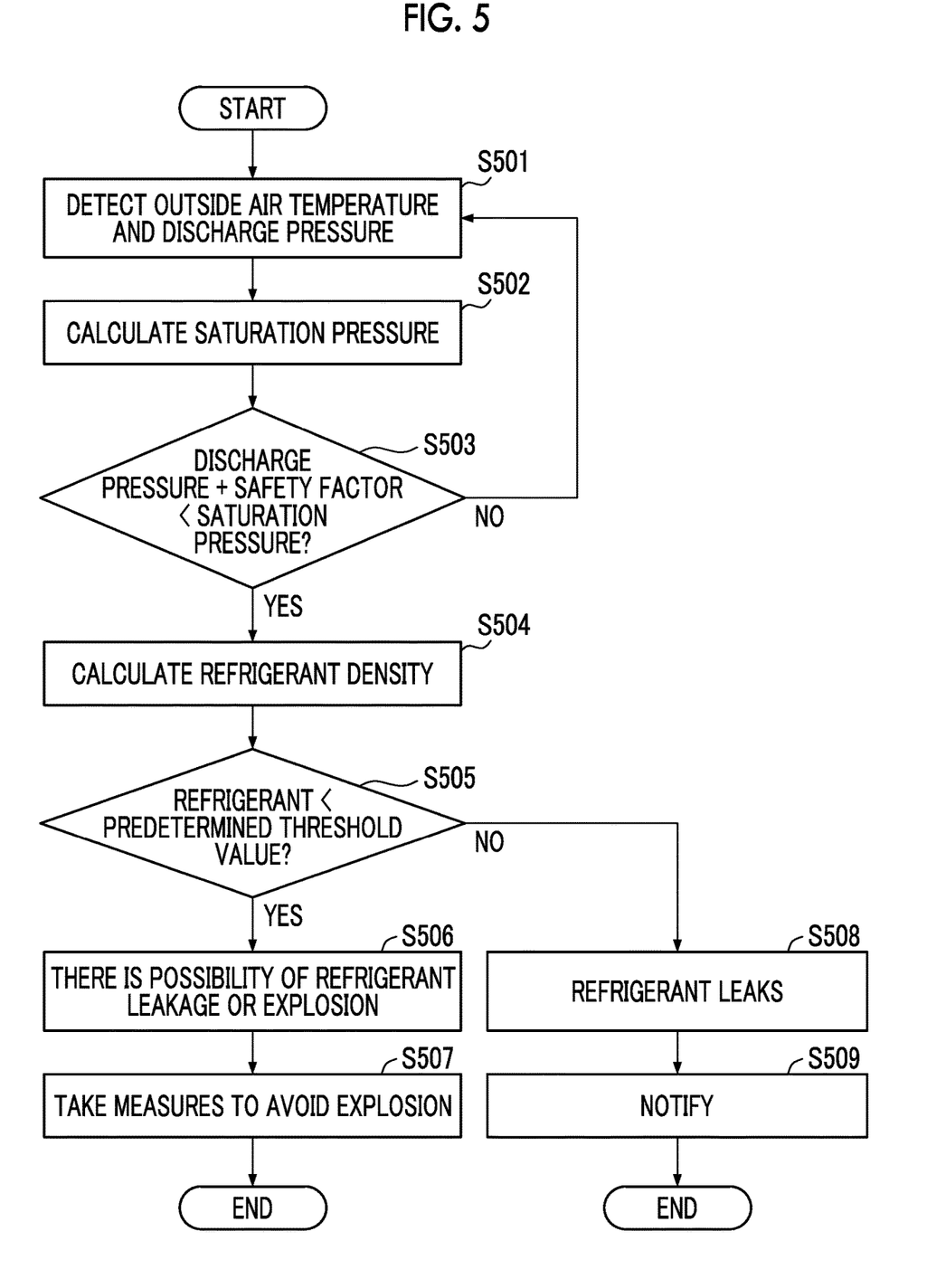
FIG. 5 is a flowchart showing an aspect of determination in the vehicle air conditioning system according to some embodiments.

FIG. 5 is a flowchart showing an aspect of determination in the vehicle air conditioning system according to some embodiments.

In a case where control of determination starts, the control device 40 acquires an outside air temperature detected by the outside air temperature sensor 44 and pressure (discharge pressure) of the refrigerant detected by the pressure sensor 49 (S501).

Next, the control device 40 calculates saturation pressure of the refrigerant from the acquired outside air temperature (S502).

Figure 6:
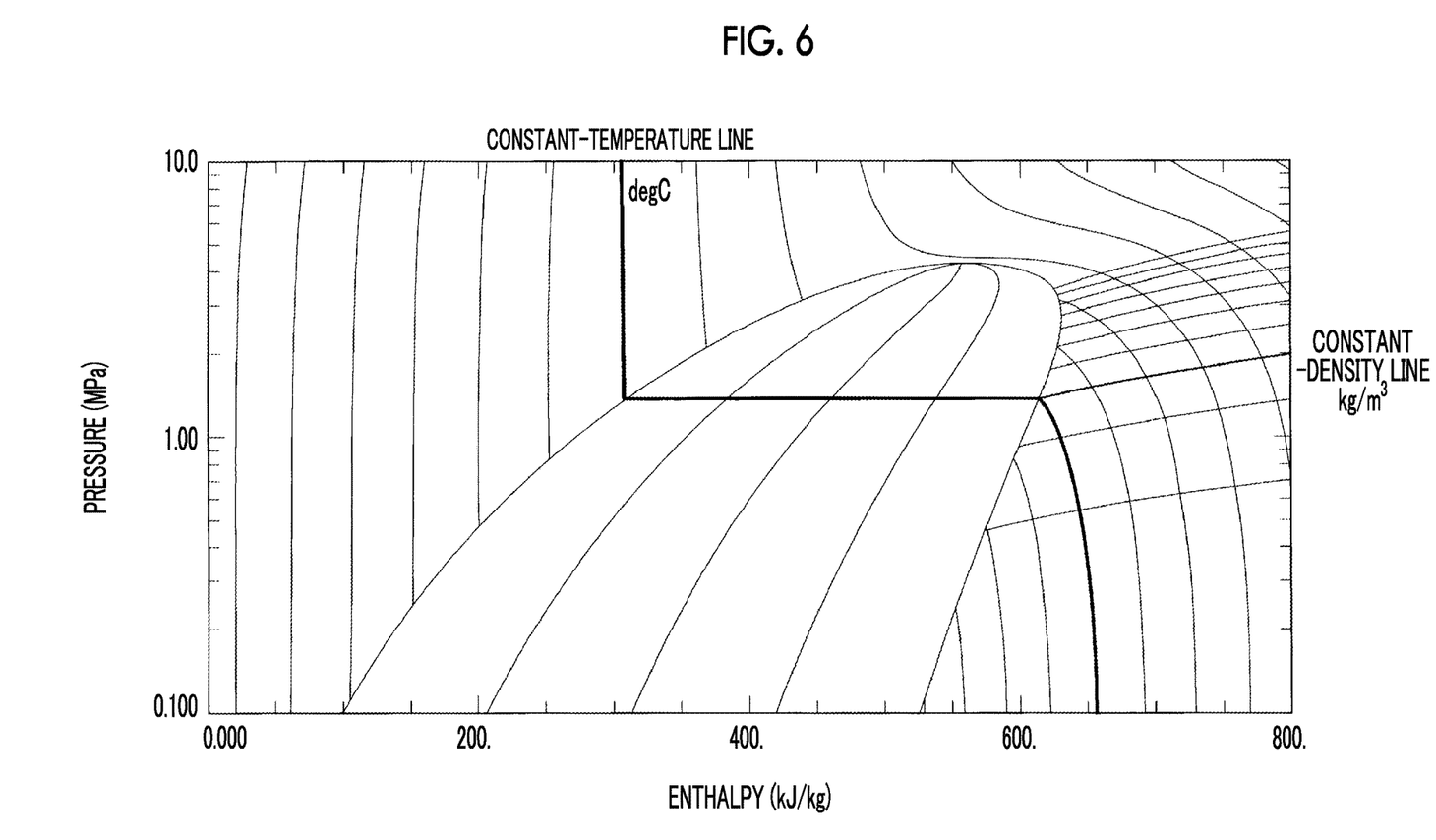
FIG. 6 is a Mollier chart showing an aspect of propane.

FIG. 6 is a Mollier chart showing an aspect of propane. As shown in the Mollier chart of FIG. 6, for example, in a case where the outside air temperature is 40° C., the saturation pressure of propane is 1320 kPa.

Next, determination is made whether or not a value obtained by adding a safety factor to the pressure of propane detected by the pressure sensor 49 falls below the saturation pressure of propane calculated in Step S502 (S503).

In a case where determination is made that the value obtained by adding the safety factor to the pressure of propane falls below the saturation pressure of propane, the process progresses to Step S504. On the other hand, in a case where determination is made that the value obtained by adding the safety factor to the pressure of propane is equal to or greater than the saturation pressure of propane, the process returns to Step S501, and the outside air temperature and the pressure are detected again.

In the vehicle air conditioning system 1, when the air conditioning system is not operated, that is, in a state in which the compressor 15 is not operated, and the refrigerant is normally filled and does not leak, the refrigerant is in a two-phase gas-liquid state. In a case where the refrigerant is in the two-phase gas-liquid state and a liquid level of the refrigerant is present, the pressure is constant with respect to the outside air temperature as shown in the Mollier chart of FIG. 6. In a case where the liquid level of the refrigerant is present, when the refrigerant leaks, the liquid level falls, but the saturation pressure is not changed. Thus, it is difficult to accurately detect the leakage amount of the refrigerant from the outside air temperature and the pressure. In a case where the compressor 15 is not operated, since the pressure in the system is not constant, it is also difficult to accurately detect the leakage amount.

On the other hand, when a given amount or more of the refrigerant leaks and a liquid layer disappears when in a case where the compressor 15 is not operated, the refrigerant is not in a saturation state, and as shown in the Mollier chart of FIG. 6, the pressure of the refrigerant falls along a constant-temperature line with respect to the outside air temperature.

That is, in Step S503, in a case where the value obtained by adding the safety factor to the pressure of propane falls below the saturation pressure of propane, this indicates that a given amount or more of the refrigerant has leaked and the pressure of the refrigerant has fallen. Thus, there is a need to perform determination about whether or not the leakage of the refrigerant is approaching the explosion limit.

In a case where determination is made that the value obtained by adding the safety factor to the pressure of propane falls below the saturation pressure of propane, the control device 40 calculates refrigerant density (S504).

The refrigerant density is calculated from the Mollier chart of FIG. 6 based on the outside air temperature and the pressure. For example, in a case where the outside air temperature is 15.65° C. and the pressure is 101.3 kPa, the refrigerant density of propane is 1.8954 [kg/m$^3$].

As shown in the Mollier chart of FIG. 6, in a case where the pressure falls, the refrigerant density also falls.

Next, determination is made whether or not the refrigerant density calculated in Step S504 falls below the predetermined threshold value (S505).

It is assumed that the predetermined threshold value is a value (allowable density) indicating an allowable value of the refrigerant density based on the explosion limit. In a case where the refrigerant density falls below the allowable density, this indicates that the refrigerant is approaching the explosion limit.

The allowable density is represented by Expression (1) described below.

(Amount of filled refrigerant×explosion limit×atmosphere weight in vehicle cabin)/(total volume of refrigeration cycle 23 for cooling and heat pump cycle 33 for heating)        (1)

In Expression (1), the amount of filled refrigerant is an amount [kg] of the refrigerant filled at the time of manufacturing of the vehicle air conditioning system 1, the explosion limit is concentration [2.1%] of a lower explosion limit of the refrigerant (propane), the atmosphere weight in the vehicle cabin is a weight [kg] of atmosphere in the vehicle cabin obtained by multiplying the volume of the vehicle cabin where the vehicle air conditioning system 1 is placed in a case where all windows, doors, and the like are closed, by density of atmosphere in a standard state (standard density of atmosphere), and the total volume of the refrigeration cycle 23 for cooling and the heat pump cycle 33 for heating is a total volume [m$^3$] in the refrigeration cycle 23 for cooling and the heat pump cycle 33 for heating, such as the compressor 15 filled with the refrigerant, each heat exchanger (vehicle-cabin-interior evaporator 7, vehicle-cabin-interior condenser 8, vehicle-cabin-exterior condenser 17, and vehicle-cabin-exterior evaporator 27), and each refrigerant pipe.

To determine that the refrigerant is approaching the explosion limit, the allowable density may be set to a value obtained by adding the safety factor to a value calculated in Expression (1).

In Step S505, in a case where determination is made that the refrigerant density falls below the allowable density, the process progresses to Step S506.

On the other hand, in Step S505, in a case where determination is made that the refrigerant density is equal to or greater than the allowable density, the process progresses to Step S508.

In Step S505, in a case where determination is made that the refrigerant density falls below the allowable density, the control device 40 determines that a given amount or more of the refrigerant has leaked in the vehicle air conditioning system 1 and that there is a possibility of explosion (S506).

In this case, since a given amount or more of the refrigerant has leaked, and the leakage amount is approaching the explosion limit, countermeasures to avoid explosion are taken (S507).

For example, the control device 40 performs control such that the notification unit 55 issues a warning. In this case, the notification unit 55 gives any of notification by voice or alarm sound, text display on a display, or turning on of a lamp, or a plurality of kinds of notification to inform a user of the vehicle or a person in the vicinity of the vehicle that leakage of the refrigerant is approaching the explosion limit, that there is a possibility of explosion, and that countermeasures are needed. The notification unit 55 may give notification to a portable terminal of the user of the vehicle through a network or may give emergency notification by way of the portable terminal. The notification unit 55 may give notification to a car dealer, a maintenance facility, a vehicle manufacturer, or the like through a network.

With this, it is possible to inform the user of the vehicle or a person in the vicinity of the vehicle that there is a possibility of explosion and that countermeasures are needed.

As another explosion avoidance countermeasure, the control device 40 may perform control such that opening of a door of the vehicle from an outside is disabled.

With this, it is possible to prevent the refrigerant leaking into the vehicle cabin from igniting and exploding due to a spark, static electricity, or the like caused by contact of a metal or the like when the closed door of the vehicle is opened.

As another explosion avoidance countermeasure, the control device 40 may perform control such that forced ventilation is performed. In this case, the control device 40 performs control such that blowing of outside air by the vehicle-cabin-exterior fan 24 or switching by the inside air and outside air switching damper 4 is performed, and forcedly ventilates the refrigerant leaking from the refrigerant circuit into the vehicle cabin, to the outside of the vehicle.

With this, since the refrigerant leaking into the vehicle cabin is discharged outside the vehicle, and the ratio of the refrigerant in the vehicle cabin is made a value outside the range of explosion, it is possible to avoid explosion of the refrigerant.

As another explosion avoidance countermeasure, the control device 40 may perform control such that the operation of the vehicle air conditioning system 1 or the driving of the vehicle is prohibited.

With this, it is possible to prevent ignition accompanied with a start of the vehicle air conditioning system 1 or a start of an engine of the vehicle, and to avoid explosion of the refrigerant.

On the other hand, in Step S505, in a case where determination is made that the refrigerant density is equal to or greater than the allowable density, the control device 40 determines that a given amount or more of the refrigerant is leaking in the vehicle air conditioning system 1 (S508).

In this case, since a given amount or more of the refrigerant is leaking, a warning is issued (S509). The notification unit 55 gives any of notification of voice or alarm sound, text display on a display, or turning on of a lamp, or a plurality of kinds of notification to inform a user of the vehicle or a person in the vicinity of the vehicle that the refrigerant leaks and there is a possibility of explosion in this situation or countermeasures are needed. The notification unit 55 may give notification to a portable terminal of the user of the vehicle through a network or may give notification by way of the portable terminal. The notification unit 55 may give notification to a car dealer, a maintenance facility, a vehicle manufacturer, or the like through a network.

As described above, with the vehicle air conditioning system and the control method of a vehicle air conditioning system according to the embodiment, the following operations and effects are obtained.

In a case where the refrigerant that has high flammability and has the range of explosion near the normal temperature leaks from the vehicle air conditioning system 1 and the composition of the refrigerant with respect to the space reaches the explosion limit, there is a concern that the refrigerant may explode due to ignition.

In this aspect, since the refrigerant density of the refrigerant having high flammability is detected, and determination is made whether the refrigerant density falls below the predetermined threshold value, it is possible to detect whether or not the leakage amount of the refrigerant is approaching the explosion limit. For this reason, even in a case where the refrigerant having high flammability is used in the vehicle air conditioning system 1, it is possible to secure safety against explosion.

Since the refrigerant density is calculated based on the outside air temperature and the pressure, there is no need to provide new sensors for detecting leakage of the refrigerant, and it is possible to suppress costs. There is no need to secure a place for providing sensors.

Since determination is made whether or not the refrigerant density falls below the predetermined threshold value based on the amount of filled refrigerant, the total volume of the refrigeration cycle 23 for cooling and the heat pump cycle 33 for heating, the volume of the vehicle cabin, the standard density of atmosphere, and the explosion limit of the refrigerant, it is possible to determine whether or not the refrigerant density is approaching a value based on the explosion limit in the vehicle air conditioning system 1 capable of uniquely deciding the volume of a space where the system is provided.

REFERENCE SIGNS LIST

1: vehicle air conditioning system
2: HVAC unit
3: heat pump cycle
23: refrigeration cycle for cooling (refrigerant circuit for cooling)
33: heat pump cycle for heating (refrigerant circuit for heating)

40: control device
44: outside air temperature sensor
49: pressure sensor
55: notification unit

The invention claimed is:

1. A vehicle air conditioning system comprising:
a refrigerant circuit for cooling in which a compressor, switching means, a vehicle-cabin-exterior condenser, first decompression means, and a vehicle-cabin-interior evaporator provided in an HVAC unit are connected in this order;
a refrigerant circuit for heating in which the compressor, the switching means, a vehicle-cabin-interior condenser, second decompression means, and a vehicle-cabin-exterior evaporator are connected in this order;
a refrigerant that has high flammability, has a range of explosion near a normal temperature, and flows through the refrigerant circuit for cooling and the refrigerant circuit for heating;
an outside air temperature sensor that detects an outside air temperature;
a pressure sensor that detects a pressure of the refrigerant; and
a control device that calculates a refrigerant density as a density of the refrigerant based on the outside air temperature and the pressure, and determines whether or not the refrigerant density falls below a predetermined threshold value based on an amount of filled refrigerant, a total volume of the refrigerant circuit for cooling and the refrigerant circuit for heating, a volume of a vehicle cabin, a standard density of atmosphere, and an explosion limit of the refrigerant.

2. The vehicle air conditioning system according to claim 1,
wherein the control device includes a notification unit that issues a warning in a case where determination is made that the refrigerant density falls below the predetermined threshold value.

3. The vehicle air conditioning system according to claim 1,
wherein the control device disables opening of a door of a vehicle from an outside in a case where determination is made that the refrigerant density falls below the predetermined threshold value.

4. A control method of a vehicle air conditioning system having a refrigerant circuit for cooling in which a compressor, switching means, a vehicle-cabin-exterior condenser, first decompression means, and a vehicle-cabin-interior evaporator provided in an HVAC unit are connected in this order,
a refrigerant circuit for heating in which the compressor, the switching means, a vehicle-cabin-interior condenser, second decompression means, and a vehicle-cabin-exterior evaporator are connected in this order,
a refrigerant that has high flammability, has a range of explosion near a normal temperature, and flows through the refrigerant circuit for cooling and the refrigerant circuit for heating,
an outside air temperature sensor that detects an outside air temperature, and
a pressure sensor that detects a pressure of the refrigerant, the control method comprising:
a step of calculating a refrigerant density as a density of the refrigerant based on the outside air temperature and the pressure; and
a step of determining whether or not the refrigerant density falls below a predetermined threshold value based on an amount of filled refrigerant, a total volume of the refrigerant circuit for cooling and the refrigerant circuit for heating, a volume of a vehicle cabin, a standard density of atmosphere, and an explosion limit of the refrigerant.

* * * * *